United States Patent
Watanabe

(10) Patent No.: US 8,706,284 B2
(45) Date of Patent: Apr. 22, 2014

(54) METHOD AND SYSTEM FOR DIAGNOSING OPERATING STATES OF A PRODUCTION FACILITY

(75) Inventor: Mitsuaki Watanabe, Shinshiro (JP)

(73) Assignee: Sintokogio, Ltd., Aichi (JP)

(*) Notice: Subject to any disclaimer, the term of this patent is extended or adjusted under 35 U.S.C. 154(b) by 989 days.

(21) Appl. No.: 12/666,223

(22) PCT Filed: Apr. 25, 2008

(86) PCT No.: PCT/JP2008/058451
§ 371 (c)(1),
(2), (4) Date: Jun. 7, 2010

(87) PCT Pub. No.: WO2009/041109
PCT Pub. Date: Apr. 2, 2009

(65) Prior Publication Data
US 2010/0241266 A1 Sep. 23, 2010

(30) Foreign Application Priority Data
Sep. 27, 2007 (JP) .................... 2007-251192

(51) Int. Cl.
*G06F 17/00* (2006.01)
(52) U.S. Cl.
USPC ........... 700/110; 700/108; 700/200; 700/206; 700/197; 73/865.9
(58) Field of Classification Search
USPC .......... 700/108, 200, 110, 197, 206; 73/865.9
See application file for complete search history.

(56) References Cited

U.S. PATENT DOCUMENTS

| | | | |
|---|---|---|---|
| 3,977,255 A | 8/1976 | Groleau et al. | |
| 4,734,869 A | 3/1988 | Mickowski | |
| 6,108,587 A * | 8/2000 | Shearer et al. | ........... 700/200 |
| 6,519,938 B1 | 2/2003 | Foss | |
| 2003/0062643 A1 | 4/2003 | Bulgrin et al. | |
| 2004/0193385 A1 | 9/2004 | Yutkowitz | |
| 2005/0133191 A1 | 6/2005 | Brown et al. | |

FOREIGN PATENT DOCUMENTS

| | | |
|---|---|---|
| JP | 2001-293540 | 10/2001 |
| JP | 2002-263793 | 9/2002 |

OTHER PUBLICATIONS

European Patent Office, "Communication Pursuant to Article 94(3) EPC issued in EP Application 08 752 352.8," Nov. 11, 2010, 9 pages.

* cited by examiner

*Primary Examiner* — Tejal Gami
(74) *Attorney, Agent, or Firm* — Finnegan, Henderson, Farabow, Garrett & Dunner, L.L.P.

(57) ABSTRACT

A diagnostic system to diagnose a pressure profile of a molding machine M in an operating state is disclosed. The pressure profile of the molding machine M in the operating state is measured with a pressure sensor of a measurement system 3. In a diagnostic system A, a database is formed such that a reference pressure profile and the actual pressure profile selected according to a mold to be made are preserved therein. The diagnostic system A compares the reference pressure profile to the actual pressure profile in the database to determine whether the actual pressure profile is within a predetermined tolerance.

7 Claims, 5 Drawing Sheets

METHOD AND SYSTEM FOR DIAGNOSING OPERATING STATES OF A PRODUCTION FACILITY

TECHNICAL FIELD OF INVENTION

The present invention relates to a method and a system for diagnosing operating states, especially the suitability of a pressure profile of a production facility such as a molding machine or a pressing machine.

BACKGROUND OF THE INVENTION

As a preliminary step toward diagnosing the operating states of a molding machine, well known is a method for monitoring the operating states by collecting the data to be monitored that relates to operating conditions when the molding machine is in operation. For instance, conventional monitoring systems for a molding machine to carry out such a method are disclosed in Japanese Patent Early-Publications Nos. 2001-293540 and 2002-263793. Respective systems transmit data that is actually measured by sensors disposed in the molding machine when it is in operation to a monitoring unit in a remote place through a communication line. The monitoring unit displays the data on its display. The data to be monitored is data concerning an air pressure profile and processing times in one cycle of the molding process of the molding machine. The measured data is stored in a computer with a CSV (Comma Separated Value) file for every cycle.

In the conventional monitoring systems, however, the diagnosing suitability of operating states (whether or not the measured data is within the tolerance) of the molding machine relies on human judgment. Therefore, an inspector must repeatedly inspect the measured data of one of a plurality of CSV files from a monitor output or a printed output of a computer, and compare this separately with reference data or optimum data (typically, it is collected when the molding machine is in a trial operation and set up) based on the inspector's judgment. Among other things, the data on the pressure profile involves a difficulty in appropriately diagnosing it by comparing the measured data with the reference data, unless the inspector is experienced and skilled in pressure profile diagnoses. Further, it is extremely difficult to make a diagnosis, considering the varying parameters of each product to be molded, such as preset pressure conditions, pressurization time, etc.

In practice, it is very difficult by a manual operation and by an inspector's judgment to repeat a diagnosis without omitting necessary data from a huge number of files, and to avoid variations due to an inspector's skill.

Accordingly, developing a method and a system for automatically diagnosing operating states of a molding machine is considered essential for its efficient operation.

The need for such a method and a system is not limited to the molding machine, and exists, e.g., in a pressing machine that performs a pressing operation based on the preset pressure profile.

THE SUMMARY OF THE INVENTION

One object of the present invention is to provide a diagnostic system for diagnosing operating conditions of a production facility in which pressure is controlled based on a preset pressure profile that can be set according to each product to be made therefrom.

In one aspect of the present invention, the diagnostic system comprises a measurement system that includes at least a sensor for measuring an actual pressure profile corresponding to the preset pressure profile when the production facility is operated; storing means for storing a reference pressure profile that is selected according to the product to be made by the production facility and the actual pressure profile to form a database of the pressure profiles; comparing means for comparing the reference pressure profile to the actual pressure profile in the database of the pressure profiles; and determining means for determining whether the actual pressure profile is within a predetermined tolerance based on the result from the comparing means.

The reference pressure profile may be acquired for one or more kinds of products to be made from the production facility under operating conditions that are considered to be the optimum.

Preferably, the preset pressure profile is variable, and the system further includes updating means for updating the reference pressure profile following the variations in the preset pressure profile. In this case, the updating means assumes a new reference pressure profile by multiplying the reference pressure profile before being updated with a predetermined coefficient.

The diagnostic system may further include one or more output means to output data on the result that is determined. The output means may visually display an actual pressure profile that deviates from the tolerance and the relevant data.

If the production facility has one or more processing times to be diagnosed, the measurement system may further include means for measuring the processing time to be diagnosed when the production facility is operated. In this case, the storing means stores a reference processing time that is previously established and the measured processing time to form a database of the processing times. The comparing means further compares the reference processing time with the measured processing time in the database of the processing times. The determining means further determines whether the measured processing time is within a predetermined tolerance, based on the result from the comparing means. Further, the determining means may be adapted to selectively switch between the determination of the pressure profile and the determination of the processing time.

The diagnostic system may further include display means for visually displaying the result that is determined for the processing time. The result that is displayed on the display means is preferably separated by color, depending on any deviation from the reference processing time to the measured processing time. The determining means may statistically process the data in the database for each processing time to be diagnosed, to calculate the maximum value, the minimum value, and the mean value, in the database, and then displays them on the display means.

Another aspect of the present invention provides a method for diagnosing an actual pressure profile of a production facility in which pressure is controlled based on a preset pressure profile. The method comprises forming a database of a reference pressure profile that is selected according to the product to be made at the production facility and an actual pressure profile; and comparing the reference pressure profile to the actual pressure profile in the database of the pressure profiles, and determining whether the actual pressure profile is within a predetermined tolerance.

The method preferably further comprises forming a database of a reference processing time that is previously established and the actual measured processing time; and comparing the reference processing time to the measured processing time in the database of the processing times, and determining whether the measured processing time is within a predetermined tolerance based on the result of the comparison.

In the diagnostic system and the method of the present invention, the preset pressure profile is defined by a set value of a target pressure and a set value at a pressurization time.

In the diagnostic system and the method of the present invention, the production facility may be a molding machine or a pressing machine.

Yet another aspect of the present invention provides a method for diagnosing an operating state of a molding machine, aided by a computer. The molding machine controls pressure based on a preset pressure profile that can be set according to each mold to be made therefrom. The method comprises providing a reference pressure profile that is selected in accord with a mold to be made by the molding machine and an actual pressure profile that is actually measured when the molding machine is operated to the computer to form a database of the pressure profiles; and comparing the reference pressure profile to the actual pressure profile in the database of the pressure profiles by the computer to determine whether the actual pressure profile is within a predetermined tolerance.

The method preferably further comprises providing a reference processing time that is previously established for the molding machine and an actual measured processing time of the molding machine to the computer to form a database of the processing times; and comparing the reference processing time to the measured processing time in the database of the processing times by the computer to determine whether the measured processing time is within a predetermined tolerance based on the result of the comparison.

BRIEF DESCRIPTIONS OF THE DRAWINGS

The forgoing and other objects and features of the present invention will be further apparent by referring to the descriptions in the following embodiments, which refer to the accompanying drawings.

THE PREFERRED EMBODIMENT OF THE PRESENT INVENTION

Figure 1A:
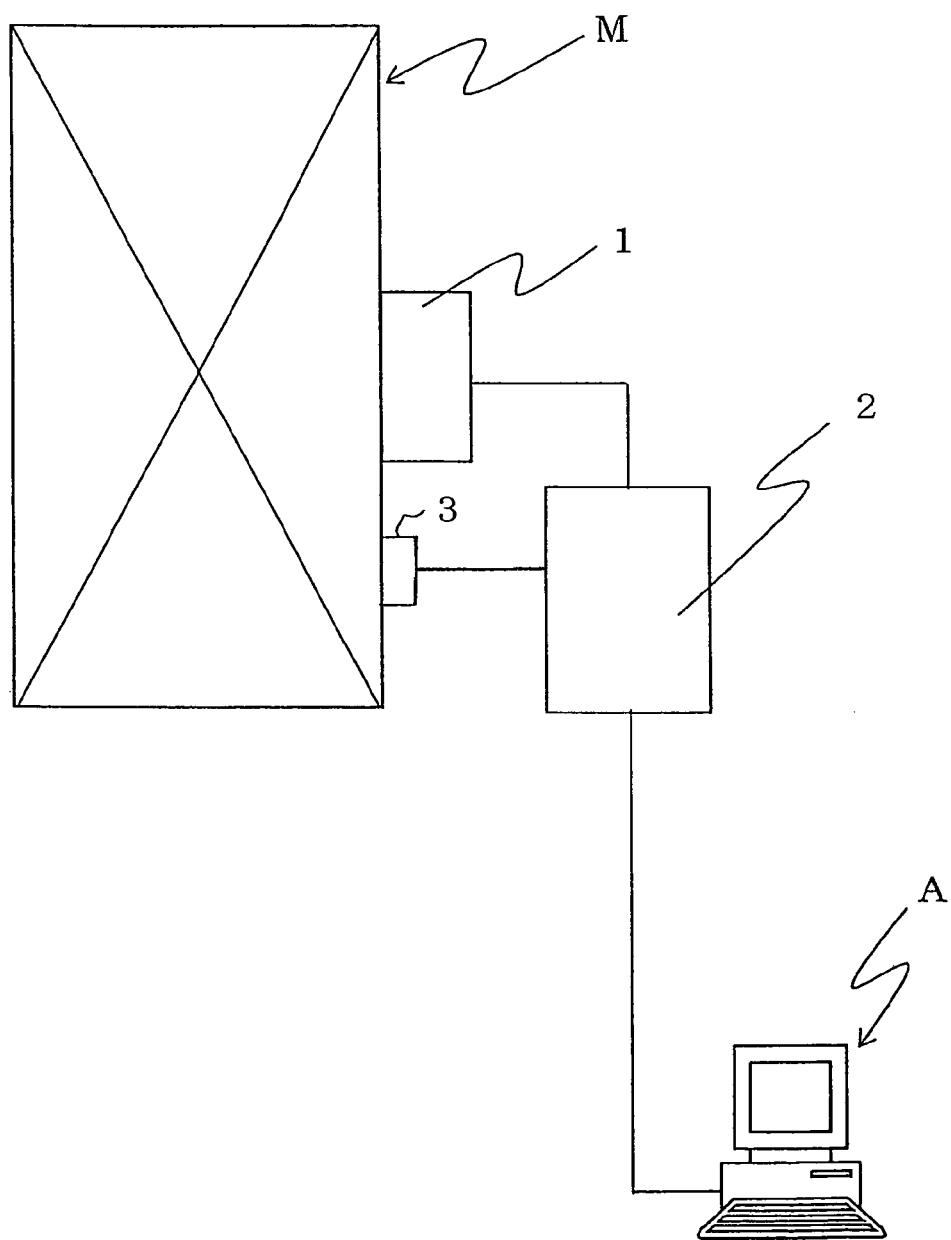
FIG. 1A illustrates a schematic block diagram of a diagnostic system of one embodiment of the present invention with a molding machine.

FIG. 1A shows a diagnostic system A of one embodiment of the present invention. The system may be applied to a diagnosis of a productive facility. In the embodiment, the system A is configured to diagnose operating states of a flaskless molding machine M, as one example. An operating panel 1 can set a target pressure and a pressurization time.

The operating panel 1 is equipped with operating switches that include one such as an ON-OFF switch necessary for operating the molding machine M. Further, a controller (not shown), which controls the sequence of the molding machine M, is mounted on a control board 2. The control board 2 is detachably connected to the diagnostic system A.

A measurement system 3, which measures the operating states of the molding machine M, includes pressure sensors (not shown) that measure the pressures of squeezing, an oil pump, aerations, and encoders (not shown) that measure the positions of cope and drag flasks.

The measurement system 3 directly provides signals of the measurements to the control board 2 such that the operating states, e.g., in a molding process, of the molding machine M, are monitored similarly to the prior art.

The control board 2 stores software involving a sequence control program of the molding machine M. The software is configured to issue operating commands to operate the molding machine M in line with the program based on the signals output from the measurement system 3. To this end, the control board 2 can be configured from, but it is not limited to, a programmable logic controller (PLC), for instance.

Figure 1B:
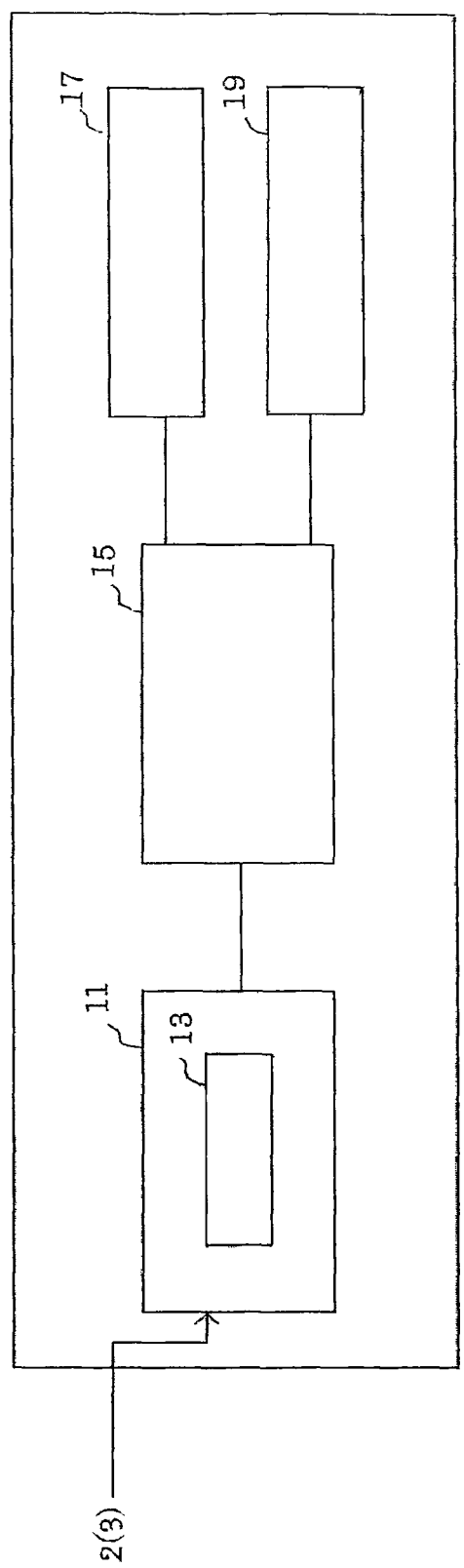
FIG. 1B is a block diagram of the diagnostic system.

As shown in FIG. 1B, the diagnostic system A includes a memory 11 that stores reference data, and measured data that is measured every cycle in an actual molding operation of the molding machine M for the specified data among data associated with the operation of the molding machine M, such as to form a database 13, and a CPU board 15 for analyzing the database 13. The CPU board 15 is composed of a CPU and peripheral circuitry such that it is configured to compare the reference data and the measured data in the database 13 by the program stored in the memory 11, to diagnose the operating states of the molding machine M based on the result of the comparison. The memory 11, the database 13, and the CPU board 15, may be configured from, but are not limited to, a personal computer that has a display 17 in which the reference data and the measured data are displayed in contrast, as an output device, and an input device 19 such as a keyboard and a mouse. The display 17 may be a touch screen such that it functions as an input device 19. The output device may include a printer to output a hard copy of the data, or a plotter.

The preset data that defines the operating conditions of the molding machine M includes a preset value of the target pressure (preset value of the pressure) and the pressurization time (command of the pressurization time), which both define the pressure profile, and a processing time, positional data, etc.

The pressure profile is of pressure profile in a sand tank. It is one of the major factors for determining the suitability of the molding process.

The operating conditions involving significant influences on the molding process in the molding machine M include the processing time, as well as the pressure profile. It is thus also desirable to diagnosis the processing time of not only the pressure profile in the molding machine M. The processing time to be diagnosed in the molding machine M involves items with high potentials to cause trouble when the molding machine M is in operation. For instance, they include, but are not limited to, the rotation time of a turntable, required times for a shuttle that carries a pattern forward and backward, required times for normal and reverse rotations of the cope flask and the drag flask when they are rotated, a required time for presetting the cope flask and the drag flask, a draw time, required times for the forward and backward movement for pushing out a mold, and the required times for overlapping, stripping, and separating the cope flask and the drag flask.

The reference data is ideal data that is a criterion for a comparative determination to diagnose the operating conditions. For instance, it may use measured data under the optimum operating conditions for the molding process of the molding machine in a trial operation and set up immediately after the molding machine is installed.

It is desirable to store and register optimum data that has been confirmed when a specific mold is made as the optimum operating conditions and the reference data in the database 13, since the data on operating conditions, the pressure profile, and the processing time of the molding machine M vary, based on each mold of an article to be molded. Because different molds are to be made, namely, the shapes of patterns are different, the number of the corresponding pattern can be assigned as an identifier of the optimum operating conditions and the reference data of each mold. For instance, n kinds of molds to be made are identified by assigning numbers of the corresponding patterns as pattern 1, pattern 2, . . . , pattern n−1, and pattern n. The diagnosis may be carried out for each pattern. Thus each mold is to be made by selecting the pattern number.

It is desirable to provide a means for selecting the data that one wishes to diagnose, if the data to be diagnosed contains a plurality of data (e.g., both the pressure profile and the processing time, or a plurality of processing times to be diagnosed, exists). To this end, it is possible to make a program such that the predetermined data may be selected by operating a cursor on the display 17 of the computer using the input device 19, e.g., the mouse, and the CPU board 15 may diagnose the operating conditions corresponding to the selected data.

The data of the pressure profile and the processing time are stored in a file, e.g., a CSV file, a TXT file (tab delimitate), or a PRN files (space delimited). The file is stored in the database 13 by replacing it with an area file of the database 13. The CPU board 15 compares the reference data and the measured data. Both together make the database such that the operating conditions can be automatically diagnosed.

Figure 2:
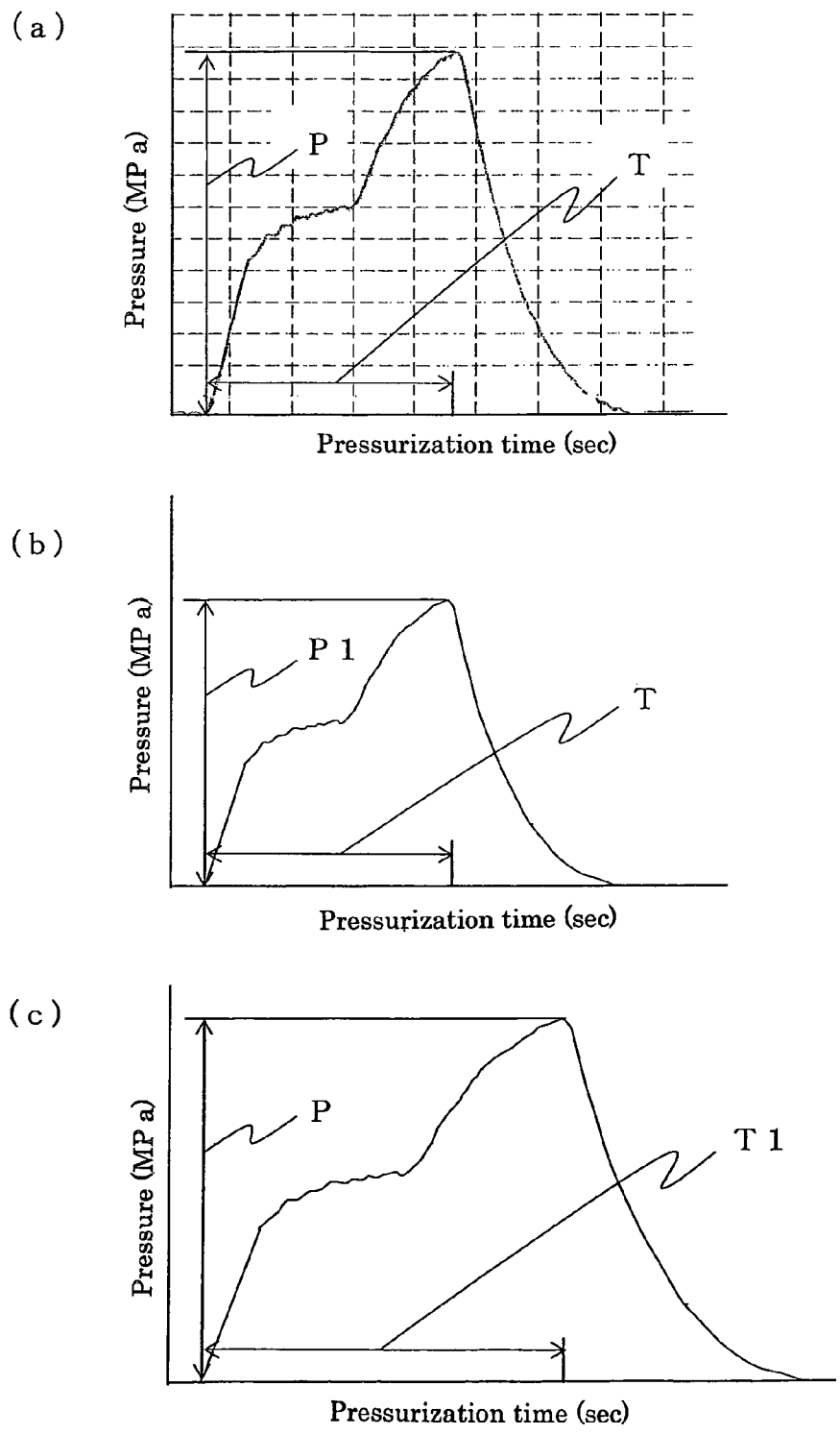
FIG. 2 are graphs indicating examples of a reference pressure profile, a pressure profile after a set value of a target pressure is changed, and a pressure profile after a set value at a pressurization time is changed.

In the molding machine M, the pressure profile involves a predetermined final pressure value P and a pressurization time T as shown in FIG. 2(a), even if a set value of the target pressure and a set value of the pressurization time T of the optimum operating conditions are set to operate the molding machine. This pressure profile is assumed to be the same one as the reference data (the reference pressure profile).

To optimize the molding process, however, the preset pressure profile is typically intended to be changed during the operation. Namely, the set values of the target pressure and the pressurization time, both defining the preset pressure profile, are varied while the molding machine M is in operation. For example, the set value of the target pressure is typically manually changed by an operator based on, e.g., properties characteristic of kneading sand, even in a molding process to make the same molds. For instance, a pressure profile in which the target pressure value P1 is lower than a reference target pressure value P, as shown in FIG. 2(b), is obtained when the set value of the target pressure is lowered below its reference set. Similarly, the pressurization time T is automatically varied by means of the controller of the control board 2 to perform an optimum molding operation of the molding machine. For instance, a pressure profile in which a pressurization time T1 is longer than a reference pressurization time T, as shown in FIG. 2(c), is obtained when a set value at the pressurization time is lengthened by more than the reference pressurization time.

Therefore, the reliability of the results of the diagnosis depends greatly on the set value of the reference pressure profile that is the criteria for a diagnosis when the actual pressure profile is diagnosed. Therefore, it is desirable to provide a new reference pressure profile if the pressure profile that is actually set in the operating conditions differs from the reference pressure profile. In this embodiment, a new reference pressure profile is thus presumed by converting the reference pressure profile in the optimum operating conditions in line with the operating conditions that correspond to the actual pressure profile.

The assumption of the new reference pressure profile is now explained in more detail. The preset pressure profile and the set value of the target pressure in the operating condition in the molding process are preserved and registered in the database 13. Further, the set value of the pressure profile is compared to the set value of the target pressure profile in the operating condition that corresponds to the measured value of the pressure profile, to derive a predetermined pressure coefficient. This coefficient is then multiplied by a reference set value of the pressure profile. Consequently, the pressure profile of the operating conditions is quantitatively processed to assume a reference pressure profile as diagnostic criteria. This assumed reference value, namely the new reference value is used—in diagnosing pressure profile that is subsequently measured. Even in the following operating conditions, a process that assumes a new reference pressure profile and that uses the presumed and reference value for the diagnosis is repeated.

The pressurization time is preserved and registered in the database as a signal corresponding to the pressurization time. The set value at the pressurization time in the operating condition that corresponds to the measured value of the pressure profile is preserved and registered in the database. Further, the set value of the pressure profile is compared to the set value at the pressurization time in the operating condition that corresponds to the measured value of the pressure profile, to derive a predetermined pressurization time coefficient. This coefficient is then multiplied by a reference set value of the pressure profile. Consequently, the pressure profile of the operating conditions is quantitatively processed to assume a reference pressure profile as diagnostic criteria. This assumed reference value, namely, the new reference value, is used in diagnosing the pressure profile that is subsequently measured. Even in the following operating conditions, a process that assumes a new reference pressure profile and that uses the presumed and reference value for the diagnosis is repeated.

With this assumed method, an excellent diagnosis of the pressure profile can be performed efficiently and optimally by assuming a new reference pressure profile to consider the set values of the target pressure profile and the pressurization time and by using this assumed and reference value for the diagnosis, rather than when the reference pressure profile in the optimum operation is used as an absolute fixed value.

Further, it is desirable to visually display data of the pressure profile that deviates from the tolerance as a result of the diagnosis of the pressure profile. To this end, the operating conditions and the operation data, for example, can be outputted to enable the review of details of that data and to plot a graph or graphs by using spreadsheet software, graph-making software, numerical analysis software, etc. It causes any data that deviates from the tolerance to be identified. Or overwriting the characteristic and the graph of other air pressure data on it enables the relationship between them to be checked. In this embodiment, one example of the spreadsheet software might be the EXCEL application, available from MICROSOFT Corporation.

Although the procedure for diagnosis in this embodiment will be described below, the present invention is not limited to such a procedure.

Figure 3:
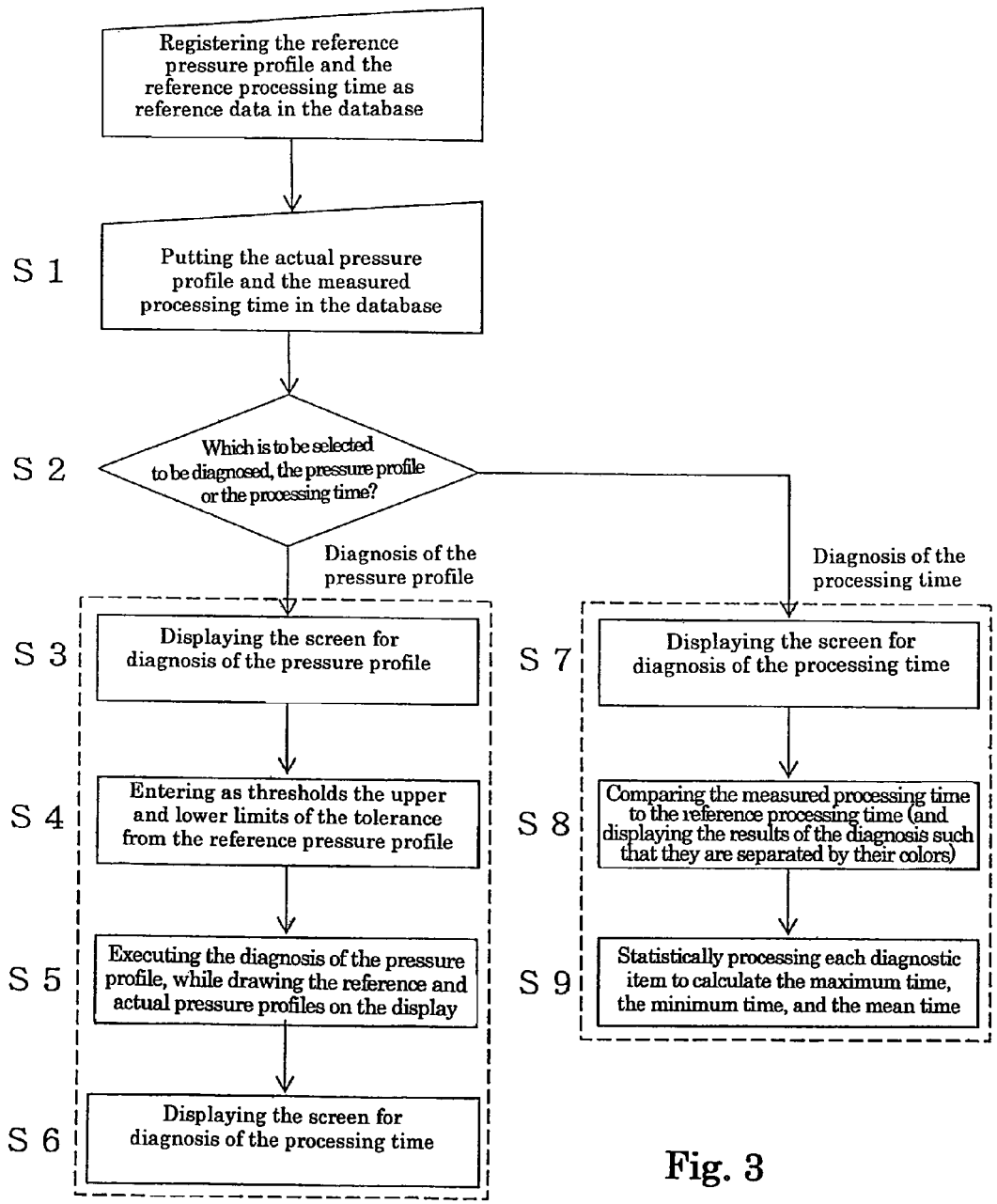
FIG. 3 is a flowchart of one example of the method of the present invention.

As in FIG. 3, the reference pressure profile and the reference processing time as reference data are registered in the database 13 of the diagnostic system A before the diagnosis begins. As described above, this reference pressure profile and the reference processing time are data captured when the molding machine M is in the start-up operation and the trial operation, and correspond to when the pressure profile and the processing time in an ideal state of the operation of the molding machine M were preserved. It may be configured such that the registration of the pressure profile and the processing time is carried out from the CSV file for each individual different mold (corresponding to the pattern number, as described above).

The measurement system 3 then puts the actual pressure profile and the measured processing time in the database 13 through the control board 2 (step S1). Such a data acquisition is taken by specifying the CSV file for which the data acquisition has been carried out when the molding machine M is in the molding operation. The manufactured mold (the pattern number) is specified so as to execute the diagnosis for each pattern number.

Either the pressure profile or the processing time to be diagnosed is selected (step S2). In this step, if the pressure profile is selected, the step proceeds to step S3, and if the processing time is selected, the step proceeds to step 7.

(1) Diagnosis of the Pressure Profile

The diagnosis screen of the pressure profile is displayed on the display 17 of the diagnostic system A (step S3). The upper and lower limits of tolerance from the reference pressure profile are then entered in the diagnostic system A as thresholds (step S4). These steps 3 and 4 may be executed by the inspector to operate the input device 19. The CPU board 15 begins the diagnosis to compare the reference pressure profile to the actual pressure profile, and to further compare the result to the thresholds. When this diagnosis is executed, the reference pressure profile and the actual pressure profile may in turn be drawn on the display 17 (step S5). The diagnostic system A may be configured such that the diagnostic results are displayed on the display 17 by instructions from the CPU board 15. For instance, it displays "OK" when the actual pressure profile is within the tolerance, and it displays "Limit Over" when deviating from the upper or lower threshold (step S6). In the latter case, the CPU board 15 records the actual pressure profile that corresponds to "Limit Over" on, e.g., the history list in memory 11. The data in the history list may be selected to be sent to the data to the EXCEL application, available from MICROSOFT Corporation to graphically display it on the display 17.

(2) Diagnosis of the Processing Time

In the diagnosis of the processing time, the reference processing time is compared to the actual measured processing time. If the results of the comparison are displayed such that they are separated by color based on their scores of any deviation, they may immediately bring about a visual evaluation by a person. Therefore, it is preferable to configure the CPU board 15 such that it determines whether the actual measured processing time is within the reference value and displays the results that are determined in separate colors on the display 17. It is also preferable that the CPU board 15 has a function for statistically processing the diagnostic results of the processing time to quickly calculate the maximum value, the minimum value, and the mean value, in the database. If there is a plurality of items to be diagnosed for the processing time, such a statistical processing is executed per item. Just the data that involves a significant effect on the maintenance of the facilities may be extracted from among an enormous quantity of data, to display it on the display 17 in a view format.

To execute the diagnosis of the processing time, the inspector operates the input device 19 to display a diagnostic screen for the processing time on the display 17 (step S7). The CPU board 15 compares the measured processing time to the reference processing time for each diagnostic item at each CSV file (step S8). The CPU board 15 displays the diagnostic results on the display 17 such that they are separated by their colors. For instance, if the deviation from the reference processing time to the measured processing time is within ±8%, it is displayed in green. If it is within ±10%, it is displayed in yellow, or if it deviates from the range by ±10, it is displayed in pink. The CPU board 15 statistically processes each diagnostic item to calculate the maximum time, the minimum time, and the mean time. The total ratios of the data within 8%, and data within 10%, in the result of the diagnosis, are also displayed in percentages (step S9). Because the state of, e.g., the variation of the aging molding machine in each item diagnosed becomes known, it also aids in preventive maintenance.

Figure 4:
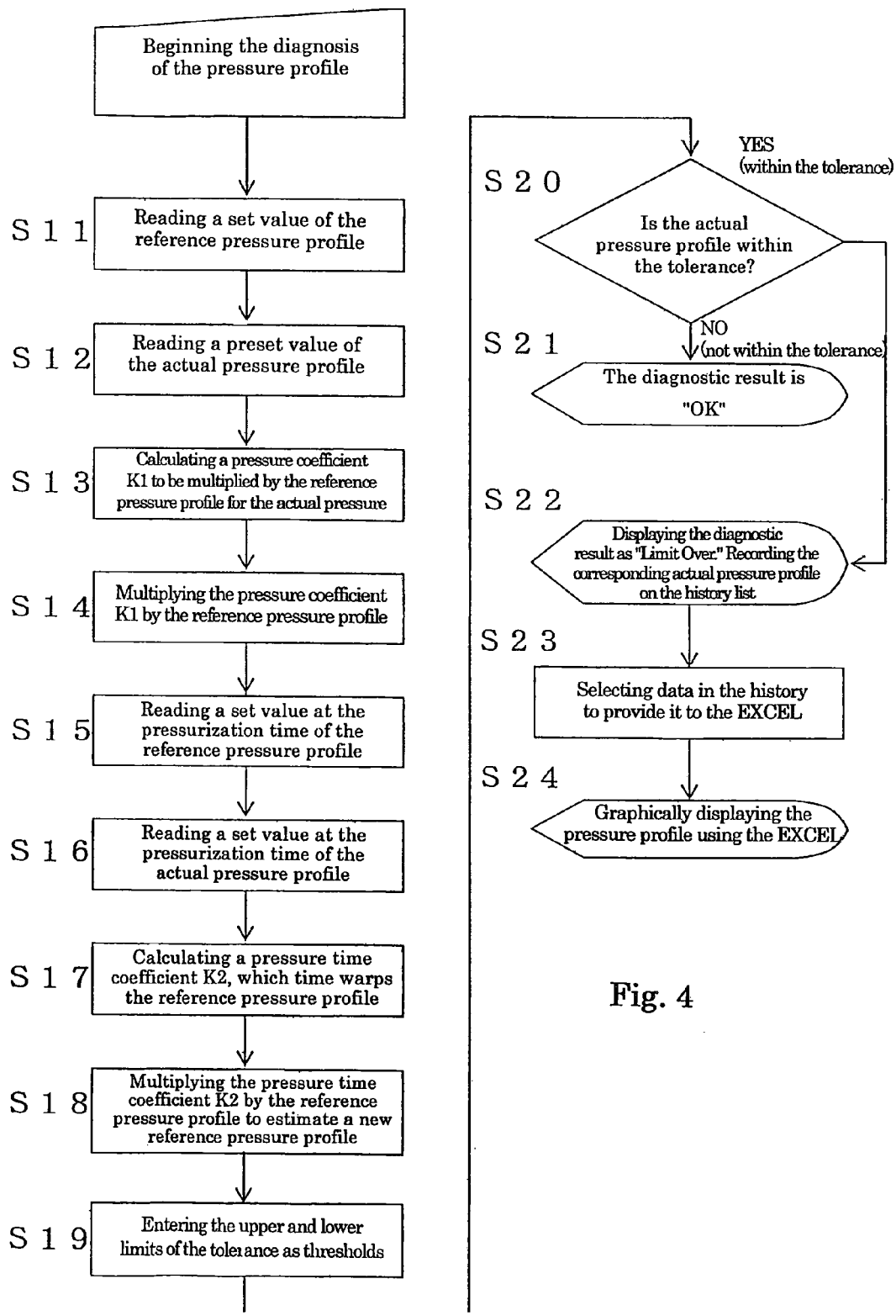
FIG. 4 is a flowchart of one example of a pressure profile diagnosis of the method of the present invention.

(3) Presumption of the Reference Pressure Profile and Diagnosis of the Pressure Profile With the diagnostic system A begins the pressure diagnostics, as shown in FIG. 4, the CPU board 15 reads a set value before the reference pressure profile is updated (step S11). The CPU board 15 then reads a preset value of the target pressure of the pressure profile corresponding to the actual pressure profile (step S12). The CPU board 15 calculates pressure coefficient K1 to be multiplied by the reference pressure profile for this actual pressure profile (step S13). The CPU board 15 multiplies the pressure coefficient K1 by the reference pressure profile (step S14). The pressure coefficient K1 becomes "1" if the set value of the target pressure in the reference pressure profile is the same as the set value of the target pressure in the actual pressure profile, i.e., there is no change in the former.

The CPU board 15 then reads a set value at the pressurization time of the reference pressure profile and reads a set value at the pressurization time of the pressure profile corresponding to the actual pressure profile (steps S15 and S16). The CPU board 15 then calculates a pressurization time coefficient K2, which warps the reference pressure profile with the time axis. The CPU board 15 multiplies the pressurization time coefficient K2 by the reference pressure profile, which in turn has been multiplied by the pressure coefficient K1, so as to estimate a new reference pressure profile (steps S17 and S18). The pressure pressurization time K2 becomes "1," if the set value of the pressurization time in the reference pressure profile is the same as the set value of the pressurization time in the actual pressure profile, i.e., there is no change in the former.

The upper and lower limits of the tolerance from the new reference pressure profile are then entered in the diagnostic system A as thresholds (step S19). This step 19 may be executed by the inspector to manually operate the input device 19 or may be automatically executed by a program that is installed in the CPU board 15. The CPU board 15 diagnoses the actual pressure profile by using the new reference pressure profile with the thresholds. If the actual pressure profile is within the tolerance, the CPU board 15 displays, e.g., the word "OK" on the display 17 and completes the diagnosis (steps S20 and S21). If the actual pressure profile is not within the tolerance (i.e., it deviates from the upper or lower threshold), the CPU board 15 displays, e.g., the words "Limit Over" on the display 17, and records the corresponding actual pressure profile on the history list in the memory 11 (step S22). Any data in the history list may be selected to be provided to the EXCEL application, available from the MICROSOFT Corporation (step S23), to graphically display the pressure profile on the display 17 (step S24).

Because this embodiment assumes the new reference pressure profile in consideration of the set value of the target pressure and the set value at the pressurization time of the pressure profile corresponding to the actual pressure profile, and uses this assumed reference pressure profile for the diagnosis, a highly accurate diagnosis of the pressure profile can be realized.

In the embodiment, the diagnostic system of the present invention is applied to, but is not limited to, a molding machine, such as a tight-flask molding machine or a flaskless molding machine. However, the present invention can also be applied to facilities such as a pressing machine for pressing procedures in which pressure profiles are established based on preset pressures for respective products.

The diagnostic system A of the present invention may optionally include a function to aid the confirmation of the safety conditions of the production facility by the operator when it is started up before the diagnosis of its operating states begins. For instance, if the operating panel 1 that operates the production facility has a touch screen, one or more safety conditions to be confirmed and one or more selection keys may be displayed on this touch screen when the production facility is to start up. The operator then operates the selection keys that are matched to the corresponding safety conditions. If the production facility is the molding machine M, the safety conditions to be confirmed may include "Is piping definitely connected?" and "Is air, water, oil leaking from piping or hose?" After the operation of the selecting keys for the given safety conditions has been completed, the diagnostic system A determines whether the safety conditions at the production facility is in start up are confirmed. The diagnostic system A then switches the screen of the touch panel to a prescribed screen based on the result that is determined. If any trouble in the production facility is detected by the result that is determined, the production facility is started up after the detected trouble is resolved, to further improve the accuracy of the diagnosis. To confirm the safety conditions, utilized may be the control board 2 or the display 17 and the input device 19, all in place of the operating panel 1.

Because the forgoing embodiments are just described for just illustrative purposes, rather than being intended to limit the present invention, those skilled in the art will recognize that many variations or modifications can be made within the sprit of the present invention, which is defined by the appended claims.

The invention claimed is:

1. A system for diagnosing operating conditions of a molding machine comprising:
   storing means for storing in a database a reference pressure profile that is previously obtained when a molding process is carried out under an operating condition that is considered to be the optimum condition and an actual measured pressure profile that is acquired for every cycle when an actual molding process is carried out;
   comparing means for comparing said reference pressure profile and said actual measured pressure profile;
   diagnosing means for diagnosing the operating conditions of the molding machine based on the result from said comparing means, wherein said diagnosing means includes switching means for switching said diagnosing means to the diagnosis for said actual measured pressure profile to be diagnosed; and
   estimating means for calculating a pressure coefficient to be multiplied by the reference pressure profile for the actual pressure profile to then multiply the calculated pressure coefficient by the reference pressure profile, and for calculating a pressurization time coefficient that warps the reference pressure profile with the time axis, to multiply the pressurization time coefficient by the reference pressure profile, which in turn has been multiplied by the pressure coefficient, so as to estimate a new reference pressure profile.

2. The diagnostic system of claim 1, wherein said reference pressure profile is stored in said database for different molding products to be made.

3. The diagnostic system of claim 1, wherein said operating conditions of the molding machine are stored that correspond to said actual measured pressure profile.

4. The diagnostic system of claim 1, further comprising verifying and displaying means for outputting all data of said pressure profile that deviates from a predetermined tolerance based on the result of diagnosing the pressure profile, and for verifying outputted data in detail and graphically displaying the outputted data.

5. A method for diagnosing operating conditions of a molding machine comprising the steps of:
   storing in a database a reference pressure profile that is previously obtained when a molding process is carried out under an operating condition that is considered to be the optimum condition and an actual measured pressure profile that is obtained for every cycle when an actual molding process is carried out;
   comparing said reference pressure profile and said actual measured pressure profile;
   diagnosing operating conditions of a machine based on the result from said comparing step by diagnosing means that include switching means for switching said diagnosis means to the diagnosis for said actual measured pressure profile to be diagnosed; and
   calculating a pressure coefficient to be multiplied by the reference pressure profile for the actual pressure profile to multiply the calculated pressure coefficient by the reference pressure profile, and then calculating a pressurization time coefficient that warps the reference pressure profile with the time axis, to multiply the pressurization time coefficient by the reference pressure profile, which in turn has been multiplied by the pressure coefficient, so as to estimate a new reference pressure profile.

6. The method of claim 5, wherein said reference pressure profile is stored in said database for different molding products to be made.

7. The method of claim 6, wherein said operating conditions of the molding machine are stored that correspond to said actual measured pressure profile.

* * * * *